(12) United States Patent
Jakob et al.

(10) Patent No.: US 11,533,909 B2
(45) Date of Patent: Dec. 27, 2022

(54) PLANT PROTECTION AND/OR PLANT GROWTH PROMOTION SYSTEM

(71) Applicant: RHEINISCH-WESTFÄLISCHE TECHNISCHE HOCHSCHULE AACHEN (RWTH), Aachen (DE)

(72) Inventors: Felix Jakob, Lüdenscheid (DE); Andrij Pich, Herzogenrath (DE); Kristin Rübsam, Aachen (DE); Uwe Conrath, Kelmis (BE); Nursen Sözer, Übach-Palenberg (DE); Ulrich Schwaneberg, Kelmis-hergenrath (BE)

(73) Assignee: RHEINISCH-WESTFÄLISCHE TECHNISCHE HOCHSCHULE (RWTH) AACHEN, Aachen (DE)

( * ) Notice: Subject to any disclaimer, the term of this patent is extended or adjusted under 35 U.S.C. 154(b) by 428 days.

(21) Appl. No.: 15/553,267

(22) PCT Filed: Dec. 22, 2015

(86) PCT No.: PCT/EP2015/080922
§ 371 (c)(1),
(2) Date: Aug. 24, 2017

(87) PCT Pub. No.: WO2016/134806
PCT Pub. Date: Sep. 1, 2016

(65) Prior Publication Data
US 2018/0035663 A1    Feb. 8, 2018

(30) Foreign Application Priority Data
Feb. 24, 2015 (DE) .................... 10 2015 203 317.1

(51) Int. Cl.
*A01N 63/00*    (2020.01)
*A01N 25/04*    (2006.01)
*A01N 37/46*    (2006.01)
*A01N 25/24*    (2006.01)

(52) U.S. Cl.
CPC ............. *A01N 25/04* (2013.01); *A01N 25/24* (2013.01); *A01N 37/46* (2013.01)

(58) Field of Classification Search
CPC .......... A01N 25/04; A01N 25/24; A01N 37/46
See application file for complete search history.

(56) References Cited

U.S. PATENT DOCUMENTS

| 2007/0149409 A1* | 6/2007 | Burnet | .................. A01N 25/02 |
| | | | 504/360 |
| 2011/0123438 A1* | 5/2011 | Wickline | ............. A61K 9/5123 |
| | | | 424/1.37 |

FOREIGN PATENT DOCUMENTS

WO    WO-2009/151788 A2    12/2009

OTHER PUBLICATIONS

Gong et al. Biochemistry. 2011; 50: 3621-3627. (Year: 2011).*
Jan. 1, 2014 (Jan. 1, 2014), XP055252148, Retrieved from the Internet: URL:http://www.biosc.de/bifuprots [retrieved on Feb. 22, 2016].
Muhammad Noor et al: "Polymersome surface decoration by an EGFP fusion protein employing Cecropin A as peptide anchor", Journal of Biotechnology, Elsevier Science Publishers, Amsterdam, NL, vol. 157, No. 1, Oct. 14, 2011 (Oct. 14, 2011), pp. 31-37 XP028395726, abstract.
International Search Report, PCT/EP2015/080922.
Chilean Office Action dated May 15, 2019 for corresponding Application.
Schwaneberg, Ulrich et al., "Bifunctional fusion proteins for plant protection," Boost Fund Project BiFuProts, 2019, pp. 1-4.
Noor, Muhammad et al., "Polymersome surface decoration by an EGFP fusion protein employing Cecropin A as peptide "anchor"," Journal of Biotechnology, vol. 157, 2012, pp. 31-37.

* cited by examiner

*Primary Examiner* — David Browe
(74) *Attorney, Agent, or Firm* — Polsinelli PC

(57) ABSTRACT

The invention relates to a plant protection and/or plant growth promotion system, comprising at least one anchor peptide for increased binding to a plant part, a support function, which is indirectly or directly bound to the anchor peptide, and an active substance for protecting the plant and/or promoting plant growth and yield.

20 Claims, 1 Drawing Sheet
Specification includes a Sequence Listing.

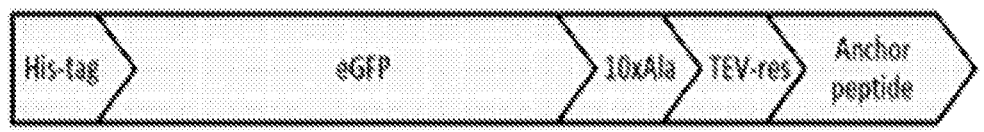

SEQUENCE LISTING

```
<160> NUMBER OF SEQ ID NOS: 60

<210> SEQ ID NO 1
<211> LENGTH: 38
<212> TYPE: PRT
<213> ORGANISM: Artificial Sequence
<220> FEATURE:
<223> OTHER INFORMATION: Antifungal protein 1

<400> SEQUENCE: 1

Ala Gly Cys Ile Lys Asn Gly Gly Arg Cys Asn Ala Ser Ala Gly Pro
1               5                   10                  15

Pro Tyr Cys Cys Ser Ser Tyr Cys Phe Gln Ile Ala Gly Gln Ser Tyr
            20                  25                  30

Gly Val Cys Lys Asn Arg
        35

<210> SEQ ID NO 2
<211> LENGTH: 43
<212> TYPE: PRT
<213> ORGANISM: Artificial Sequence
<220> FEATURE:
<223> OTHER INFORMATION: Cg-Def

<400> SEQUENCE: 2

Gly Phe Gly Cys Pro Gly Asn Gln Leu Lys Cys Asn Asn His Cys Lys
1               5                   10                  15

Ser Ile Ser Cys Arg Ala Gly Tyr Cys Asp Ala Ala Thr Leu Trp Leu
            20                  25                  30

Arg Cys Thr Cys Thr Asp Cys Asn Gly Lys Lys
        35                  40

<210> SEQ ID NO 3
<211> LENGTH: 32
<212> TYPE: PRT
<213> ORGANISM: Artificial Sequence
<220> FEATURE:
<223> OTHER INFORMATION: Dermaseptin DA4

<400> SEQUENCE: 3

Gly Met Trp Ser Lys Ile Lys Asn Ala Gly Lys Ala Ala Lys Ala Ala
1               5                   10                  15

Ala Lys Ala Ala Gly Lys Ala Ala Leu Gly Ala Val Ser Glu Ala Met
            20                  25                  30
```

<210> SEQ ID NO 4
<211> LENGTH: 43
<212> TYPE: PRT
<213> ORGANISM: Artificial Sequence
<220> FEATURE:
<223> OTHER INFORMATION: Defensin

<400> SEQUENCE: 4

```
Val Thr Cys Asp Leu Leu Ser Phe Glu Ala Lys Gly Phe Ala Ala Asn
1               5                   10                  15

His Ser Leu Cys Ala Ala His Cys Leu Ala Ile Gly Arg Arg Gly Gly
            20                  25                  30

Ser Cys Glu Arg Gly Val Cys Ile Cys Arg Arg
        35                  40
```

<210> SEQ ID NO 5
<211> LENGTH: 47
<212> TYPE: PRT
<213> ORGANISM: Artificial Sequence
<220> FEATURE:
<223> OTHER INFORMATION: hDermcidin

<400> SEQUENCE: 5

```
Ser Ser Leu Leu Glu Lys Gly Leu Asp Gly Ala Lys Lys Ala Val Gly
1               5                   10                  15

Gly Leu Gly Lys Leu Gly Lys Asp Ala Val Glu Asp Leu Glu Ser Val
            20                  25                  30

Gly Lys Gly Ala Val His Asp Val Lys Asp Val Leu Asp Ser Val
        35                  40                  45
```

<210> SEQ ID NO 6
<211> LENGTH: 42
<212> TYPE: PRT
<213> ORGANISM: Artificial Sequence
<220> FEATURE:
<223> OTHER INFORMATION: Pelovaterin

<400> SEQUENCE: 6

```
Asp Asp Thr Pro Ser Ser Arg Cys Gly Ser Gly Gly Trp Gly Pro Cys
1               5                   10                  15

Leu Pro Ile Val Asp Leu Leu Cys Ile Val His Val Thr Val Gly Cys
            20                  25                  30

Ser Gly Gly Phe Gly Cys Cys Arg Ile Gly
        35                  40
```

<210> SEQ ID NO 7
<211> LENGTH: 21
<212> TYPE: PRT
<213> ORGANISM: Artificial Sequence
<220> FEATURE:
<223> OTHER INFORMATION: Thanatin

<400> SEQUENCE: 7

```
Gly Ser Lys Lys Pro Val Pro Ile Ile Tyr Cys Asn Arg Arg Thr Gly
1               5                   10                  15

Lys Cys Gln Arg Met
            20
```

<210> SEQ ID NO 8
<211> LENGTH: 25
<212> TYPE: PRT
<213> ORGANISM: Artificial Sequence
<220> FEATURE:

<223> OTHER INFORMATION: Androctonin

<400> SEQUENCE: 8

Arg Ser Val Cys Arg Gln Ile Lys Ile Cys Arg Arg Arg Gly Gly Cys
1               5                   10                  15

Tyr Tyr Lys Cys Thr Asn Arg Pro Tyr
            20                  25

<210> SEQ ID NO 9
<211> LENGTH: 38
<212> TYPE: PRT
<213> ORGANISM: Artificial Sequence
<220> FEATURE:
<223> OTHER INFORMATION: TAP_20_N

<400> SEQUENCE: 9

Asn Pro Val Ser Cys Val Arg Asn Lys Gly Ile Cys Val Pro Ile Arg
1               5                   10                  15

Cys Pro Gly Asn Met Lys Gln Ile Gly Thr Cys Val Gly Arg Ala Val
            20                  25                  30

Lys Cys Cys Arg Lys Lys
            35

<210> SEQ ID NO 10
<211> LENGTH: 77
<212> TYPE: PRT
<213> ORGANISM: Artificial Sequence
<220> FEATURE:
<223> OTHER INFORMATION: PgD5

<400> SEQUENCE: 10

Met Glu Lys Arg Met Gly Ser Leu Ser Val Leu Phe Leu Leu Leu Val
1               5                   10                  15

Leu Val Thr Ser Phe Glu Met Gln Val Glu Gly Arg Met Cys Glu Ser
            20                  25                  30

Gln Ser His Lys Phe Lys Gly Tyr Cys Ala Ser Ser Asn Cys Lys
            35                  40                  45

Val Val Cys Gln Thr Glu Lys Phe Leu Thr Gly Ser Cys Arg Asp Thr
50                  55                  60

His Phe Gly Asn Arg Arg Cys Phe Cys Glu Lys Pro Cys
65                  70                  75

<210> SEQ ID NO 11
<211> LENGTH: 45
<212> TYPE: PRT
<213> ORGANISM: Artificial Sequence
<220> FEATURE:
<223> OTHER INFORMATION: Alpha-purothionin

<400> SEQUENCE: 11

Lys Ser Cys Cys Arg Ser Thr Leu Gly Arg Asn Cys Tyr Asn Leu Cys
1               5                   10                  15

Arg Ala Arg Gly Ala Gln Lys Leu Cys Ala Gly Val Cys Arg Cys Lys
            20                  25                  30

Ile Ser Ser Gly Leu Ser Cys Pro Lys Gly Phe Pro Lys
            35                  40                  45

<210> SEQ ID NO 12
<211> LENGTH: 48
<212> TYPE: PRT
<213> ORGANISM: Artificial Sequence
<220> FEATURE:

<223> OTHER INFORMATION: Carnobacteriocin B2

<400> SEQUENCE: 12

Val Asn Tyr Gly Asn Gly Val Ser Cys Ser Lys Thr Lys Cys Ser Val
1               5                   10                  15

Asn Trp Gly Gln Ala Phe Gln Glu Arg Tyr Thr Ala Gly Ile Asn Ser
            20                  25                  30

Phe Val Ser Gly Val Ala Ser Gly Ala Gly Ser Ile Gly Arg Arg Pro
        35                  40                  45

<210> SEQ ID NO 13
<211> LENGTH: 36
<212> TYPE: PRT
<213> ORGANISM: Artificial Sequence
<220> FEATURE:
<223> OTHER INFORMATION: MMGP1

<400> SEQUENCE: 13

Met Leu Trp Ser Ala Ser Met Arg Ile Phe Ala Ser Ala Phe Ser Thr
1               5                   10                  15

Arg Gly Leu Gly Thr Arg Met Leu Met Tyr Cys Ser Leu Pro Ser Arg
            20                  25                  30

Cys Trp Arg Lys
        35

<210> SEQ ID NO 14
<211> LENGTH: 38
<212> TYPE: PRT
<213> ORGANISM: Artificial Sequence
<220> FEATURE:
<223> OTHER INFORMATION: Macaque histatin

<400> SEQUENCE: 14

Asp Ser His Glu Glu Arg His His Gly Arg His Gly His His Lys Tyr
1               5                   10                  15

Gly Arg Lys Phe His Glu Lys His His Ser His Arg Gly Tyr Arg Ser
            20                  25                  30

Asn Tyr Leu Tyr Asp Asn
        35

<210> SEQ ID NO 15
<211> LENGTH: 76
<212> TYPE: PRT
<213> ORGANISM: Artificial Sequence
<220> FEATURE:
<223> OTHER INFORMATION: MiAMP1

<400> SEQUENCE: 15

Ser Ala Phe Thr Val Trp Ser Gly Pro Gly Cys Asn Asn Arg Ala Glu
1               5                   10                  15

Arg Tyr Ser Lys Cys Gly Cys Ser Ala Ile His Gln Lys Gly Gly Tyr
            20                  25                  30

Asp Phe Ser Tyr Thr Gly Gln Thr Ala Ala Leu Tyr Asn Gln Ala Gly
        35                  40                  45

Cys Ser Gly Val Ala His Thr Arg Phe Gly Ser Ser Ala Arg Ala Cys
    50                  55                  60

Asn Pro Phe Gly Trp Lys Ser Ile Phe Ile Gln Cys
65                  70                  75

<210> SEQ ID NO 16
<211> LENGTH: 33

```
<212> TYPE: PRT
<213> ORGANISM: Artificial Sequence
<220> FEATURE:
<223> OTHER INFORMATION: MBP-1

<400> SEQUENCE: 16

Arg Ser Gly Arg Gly Glu Cys Arg Arg Gln Cys Leu Arg Arg His Glu
1               5                   10                  15

Gly Gln Pro Trp Glu Thr Gln Glu Cys Met Arg Arg Cys Arg Arg Arg
            20                  25                  30

Gly

<210> SEQ ID NO 17
<211> LENGTH: 128
<212> TYPE: PRT
<213> ORGANISM: Artificial Sequence
<220> FEATURE:
<223> OTHER INFORMATION: RNase 7

<400> SEQUENCE: 17

Lys Pro Lys Gly Met Thr Ser Ser Gln Trp Phe Lys Ile Gln His Met
1               5                   10                  15

Gln Pro Ser Pro Gln Ala Cys Asn Ser Ala Met Lys Asn Ile Asn Lys
            20                  25                  30

His Thr Lys Arg Cys Lys Asp Leu Asn Thr Phe Leu His Glu Pro Phe
        35                  40                  45

Ser Ser Val Ala Ala Thr Cys Gln Thr Pro Lys Ile Ala Cys Lys Asn
    50                  55                  60

Gly Asp Lys Asn Cys His Gln Ser His Gly Ala Val Ser Leu Thr Met
65                  70                  75                  80

Cys Lys Leu Thr Ser Gly Lys Tyr Pro Asn Cys Arg Tyr Lys Glu Lys
                85                  90                  95

Arg Gln Asn Lys Ser Tyr Val Val Ala Cys Lys Pro Pro Gln Lys Lys
            100                 105                 110

Asp Ser Gln Gln Phe His Leu Val Pro Val His Leu Asp Arg Val Leu
        115                 120                 125

<210> SEQ ID NO 18
<211> LENGTH: 28
<212> TYPE: PRT
<213> ORGANISM: Artificial Sequence
<220> FEATURE:
<223> OTHER INFORMATION: Shepherin I

<400> SEQUENCE: 18

Gly Tyr Gly Gly His Gly Gly His Gly Gly His Gly Gly His Gly Gly
1               5                   10                  15

His Gly Gly His Gly Gly Gly Gly His Gly
            20                  25

<210> SEQ ID NO 19
<211> LENGTH: 63
<212> TYPE: PRT
<213> ORGANISM: Artificial Sequence
<220> FEATURE:
<223> OTHER INFORMATION: Snakin-1

<400> SEQUENCE: 19

Gly Ser Asn Phe Cys Asp Ser Lys Cys Lys Leu Arg Cys Ser Lys Ala
1               5                   10                  15

Gly Leu Ala Asp Arg Cys Leu Lys Tyr Cys Gly Ile Cys Cys Glu Glu
```

```
            20                  25                  30

Cys Lys Cys Val Pro Ser Gly Thr Tyr Gly Asn Lys His Glu Cys Pro
            35                  40                  45

Cys Tyr Arg Asp Lys Lys Asn Ser Lys Gly Lys Ser Lys Cys Pro
        50                  55                  60
```

<210> SEQ ID NO 20
<211> LENGTH: 42
<212> TYPE: PRT
<213> ORGANISM: Artificial Sequence
<220> FEATURE:
<223> OTHER INFORMATION: Stomoxyn

<400> SEQUENCE: 20

```
Arg Gly Phe Arg Lys His Phe Asn Lys Leu Val Lys Lys Val Lys His
1               5                   10                  15

Thr Ile Ser Glu Thr Ala His Val Ala Lys Asp Thr Ala Val Ile Ala
            20                  25                  30

Gly Ser Gly Ala Ala Val Val Ala Ala Thr
            35                  40
```

<210> SEQ ID NO 21
<211> LENGTH: 29
<212> TYPE: PRT
<213> ORGANISM: Artificial Sequence
<220> FEATURE:
<223> OTHER INFORMATION: VarvF

<400> SEQUENCE: 21

```
Gly Val Pro Ile Cys Gly Glu Thr Cys Thr Leu Gly Thr Cys Tyr Thr
1               5                   10                  15

Ala Gly Cys Ser Cys Ser Trp Pro Val Cys Thr Arg Asn
            20                  25
```

<210> SEQ ID NO 22
<211> LENGTH: 46
<212> TYPE: PRT
<213> ORGANISM: Artificial Sequence
<220> FEATURE:
<223> OTHER INFORMATION: VrD1

<400> SEQUENCE: 22

```
Arg Thr Cys Met Ile Lys Lys Glu Gly Trp Gly Lys Cys Leu Ile Asp
1               5                   10                  15

Thr Thr Cys Ala His Ser Cys Lys Asn Arg Gly Tyr Ile Gly Gly Asn
            20                  25                  30

Cys Lys Gly Met Thr Arg Thr Cys Tyr Cys Leu Val Asn Cys
            35                  40                  45
```

<210> SEQ ID NO 23
<211> LENGTH: 39
<212> TYPE: PRT
<213> ORGANISM: Artificial Sequence
<220> FEATURE:
<223> OTHER INFORMATION: European bumblebee abaecin

<400> SEQUENCE: 23

```
Phe Val Pro Tyr Asn Pro Pro Arg Pro Tyr Gln Ser Lys Pro Phe Pro
1               5                   10                  15

Ser Phe Pro Gly His Gly Pro Phe Asn Pro Lys Ile Gln Trp Pro Tyr
            20                  25                  30

Pro Leu Pro Asn Pro Gly His
```

<210> SEQ ID NO 24
<211> LENGTH: 37
<212> TYPE: PRT
<213> ORGANISM: Artificial Sequence
<220> FEATURE:
<223> OTHER INFORMATION: Papiliocin

<400> SEQUENCE: 24

```
Arg Trp Lys Ile Phe Lys Lys Ile Glu Lys Val Gly Arg Asn Val Arg
1               5                   10                  15

Asp Gly Ile Ile Lys Ala Gly Pro Ala Val Ala Val Val Gly Gln Ala
            20                  25                  30

Ala Thr Val Val Lys
        35
```

<210> SEQ ID NO 25
<211> LENGTH: 42
<212> TYPE: PRT
<213> ORGANISM: Artificial Sequence
<220> FEATURE:
<223> OTHER INFORMATION: BM Moricin

<400> SEQUENCE: 25

```
Ala Lys Ile Pro Ile Lys Ala Ile Lys Thr Val Gly Lys Ala Val Gly
1               5                   10                  15

Lys Gly Leu Arg Ala Ile Asn Ile Ala Ser Thr Ala Asn Asp Val Phe
            20                  25                  30

Asn Phe Leu Lys Pro Lys Lys Arg Lys Ala
        35                  40
```

<210> SEQ ID NO 26
<211> LENGTH: 60
<212> TYPE: PRT
<213> ORGANISM: Artificial Sequence
<220> FEATURE:
<223> OTHER INFORMATION: Carnocyclin A

<400> SEQUENCE: 26

```
Leu Val Ala Tyr Gly Ile Ala Gln Gly Thr Ala Glu Lys Val Val Ser
1               5                   10                  15

Leu Ile Asn Ala Gly Leu Thr Val Gly Ser Ile Ile Ser Ile Leu Gly
            20                  25                  30

Gly Val Thr Val Gly Leu Ser Gly Val Phe Thr Ala Val Lys Ala Ala
        35                  40                  45

Ile Ala Lys Gln Gly Ile Lys Lys Ala Ile Gln Leu
    50                  55                  60
```

<210> SEQ ID NO 27
<211> LENGTH: 41
<212> TYPE: PRT
<213> ORGANISM: Artificial Sequence
<220> FEATURE:
<223> OTHER INFORMATION: Curvacin A

<400> SEQUENCE: 27

```
Ala Arg Ser Tyr Gly Asn Gly Val Tyr Cys Asn Asn Lys Lys Cys Trp
1               5                   10                  15

Val Asn Arg Gly Glu Ala Thr Gln Ser Ile Ile Gly Gly Met Ile Ser
            20                  25                  30

Gly Trp Ala Ser Gly Leu Ala Gly Met
```

```
<210> SEQ ID NO 28
<211> LENGTH: 25
<212> TYPE: PRT
<213> ORGANISM: Artificial Sequence
<220> FEATURE:
<223> OTHER INFORMATION: Lactoferricin B

<400> SEQUENCE: 28

Phe Lys Cys Arg Arg Trp Gln Trp Arg Met Lys Lys Leu Gly Ala Pro
1               5                   10                  15

Ser Ile Thr Cys Val Arg Arg Ala Phe
            20                  25

<210> SEQ ID NO 29
<211> LENGTH: 23
<212> TYPE: PRT
<213> ORGANISM: Artificial Sequence
<220> FEATURE:
<223> OTHER INFORMATION: Magainin 2

<400> SEQUENCE: 29

Gly Ile Gly Lys Phe Leu His Ser Ala Lys Lys Phe Gly Lys Ala Phe
1               5                   10                  15

Val Gly Glu Ile Met Asn Ser
            20

<210> SEQ ID NO 30
<211> LENGTH: 25
<212> TYPE: PRT
<213> ORGANISM: Artificial Sequence
<220> FEATURE:
<223> OTHER INFORMATION: Pleurocidin

<400> SEQUENCE: 30

Gly Trp Gly Ser Phe Phe Lys Lys Ala Ala His Val Gly Lys His Val
1               5                   10                  15

Gly Lys Ala Ala Leu Thr His Tyr Leu
            20                  25

<210> SEQ ID NO 31
<211> LENGTH: 101
<212> TYPE: PRT
<213> ORGANISM: Artificial Sequence
<220> FEATURE:
<223> OTHER INFORMATION: Psoriasin

<400> SEQUENCE: 31

Met Ser Asn Thr Gln Ala Glu Arg Ser Ile Ile Gly Met Ile Asp Met
1               5                   10                  15

Phe His Lys Tyr Thr Arg Arg Asp Asp Lys Ile Asp Lys Pro Ser Leu
            20                  25                  30

Leu Thr Met Met Lys Glu Asn Phe Pro Asn Phe Leu Ser Ala Cys Asp
        35                  40                  45

Lys Lys Gly Thr Asn Tyr Leu Ala Asp Val Phe Glu Lys Lys Asp Lys
    50                  55                  60

Asn Glu Asp Lys Lys Ile Asp Phe Ser Glu Phe Leu Ser Leu Leu Gly
65                  70                  75                  80

Asp Ile Ala Thr Asp Tyr His Lys Gln Ser His Gly Ala Ala Pro Cys
                85                  90                  95

Ser Gly Gly Ser Gln
```

<210> SEQ ID NO 32
<211> LENGTH: 25
<212> TYPE: PRT
<213> ORGANISM: Artificial Sequence
<220> FEATURE:
<223> OTHER INFORMATION: Spinigerin

<400> SEQUENCE: 32

His Val Asp Lys Lys Val Ala Asp Lys Val Leu Leu Leu Lys Gln Leu
1               5                   10                  15

Arg Ile Met Arg Leu Leu Thr Arg Leu
            20                  25

<210> SEQ ID NO 33
<211> LENGTH: 133
<212> TYPE: PRT
<213> ORGANISM: Artificial Sequence
<220> FEATURE:
<223> OTHER INFORMATION: Acanthoscurrin 1

<400> SEQUENCE: 33

Asp Val Tyr Lys Gly Gly Gly Gly Arg Tyr Gly Gly Gly Arg Tyr
1               5                   10                  15

Gly Gly Gly Gly Gly Tyr Gly Gly Gly Leu Gly Gly Gly Leu Gly
            20                  25                  30

Gly Gly Gly Leu Gly Gly Gly Lys Gly Leu Gly Gly Gly Leu Gly
            35                  40                  45

Gly Gly Gly Leu Gly Gly Gly Leu Gly Gly Gly Leu Gly Gly
            50                  55                  60

Gly Lys Gly Leu Gly Gly Gly Leu Gly Gly Gly Leu Gly Gly
65                  70                  75                  80

Gly Gly Leu Gly Gly Gly Gly Leu Gly Gly Gly Lys Gly Leu Gly Gly
                85                  90                  95

Gly Gly Leu Gly Gly Gly Gly Leu Gly Gly Gly Arg Gly Gly Gly Tyr
            100                 105                 110

Gly Gly Gly Gly Gly Tyr Gly Gly Gly Tyr Gly Gly Gly Tyr Gly Gly
                115                 120                 125

Gly Lys Tyr Lys Gly
        130

<210> SEQ ID NO 34
<211> LENGTH: 101
<212> TYPE: PRT
<213> ORGANISM: Artificial Sequence
<220> FEATURE:
<223> OTHER INFORMATION: ALF-L

<400> SEQUENCE: 34

Asp Gly Ile Trp Thr Gln Leu Ile Phe Thr Leu Val Lys Asn Leu Ala
1               5                   10                  15

Thr Leu Trp Gln Ser Gly Asp Phe Gln Phe Leu Asp His Glu Cys His
            20                  25                  30

Tyr Arg Ile Lys Pro Thr Phe Arg Leu Lys Trp Lys Tyr Lys Gly
            35                  40                  45

Lys Phe Trp Cys Pro Ser Trp Thr Ser Ile Thr Gly Arg Ala Thr Lys
    50                  55                  60

Ser Ser Arg Ser Gly Ala Val Glu His Ser Val Arg Asn Phe Val Gly
65                  70                  75                  80

Gln Ala Lys Ser Ser Gly Leu Ile Thr Gln Arg Gln Ala Glu Gln Phe
            85                  90                  95

Ile Ser Gln Tyr Asn
            100

<210> SEQ ID NO 35
<211> LENGTH: 79
<212> TYPE: PRT
<213> ORGANISM: Artificial Sequence
<220> FEATURE:
<223> OTHER INFORMATION: BDEF_TACTR

<400> SEQUENCE: 35

Asn Pro Leu Ile Pro Ala Ile Tyr Ile Gly Ala Thr Val Gly Pro Ser
1               5                   10                  15

Val Trp Ala Tyr Leu Val Ala Leu Val Gly Ala Ala Val Thr Ala
            20                  25                  30

Ala Asn Ile Arg Arg Ala Ser Ser Asp Asn His Ser Cys Ala Gly Asn
            35                  40                  45

Arg Gly Trp Cys Arg Ser Lys Cys Phe Arg His Glu Tyr Val Asp Thr
        50                  55                  60

Tyr Tyr Ser Ala Val Cys Gly Arg Tyr Phe Cys Arg Ser Arg
65                  70                  75

<210> SEQ ID NO 36
<211> LENGTH: 39
<212> TYPE: PRT
<213> ORGANISM: Artificial Sequence
<220> FEATURE:
<223> OTHER INFORMATION: PP102

<400> SEQUENCE: 36

Gly Ser Cys Ser Cys Ser Gly Thr Ile Ser Pro Tyr Gly Leu Arg Thr
1               5                   10                  15

Cys Arg Ala Thr Lys Thr Lys Pro Ser His Pro Thr Thr Lys Glu Thr
            20                  25                  30

His Pro Gln Thr Leu Pro Thr
        35

<210> SEQ ID NO 37
<211> LENGTH: 44
<212> TYPE: PRT
<213> ORGANISM: Artificial Sequence
<220> FEATURE:
<223> OTHER INFORMATION: Tachystatin A2

<400> SEQUENCE: 37

Tyr Ser Arg Cys Gln Leu Gln Gly Phe Asn Cys Val Val Arg Ser Tyr
1               5                   10                  15

Gly Leu Pro Thr Ile Pro Cys Cys Arg Gly Leu Thr Cys Arg Ser Tyr
            20                  25                  30

Phe Pro Gly Ser Thr Tyr Gly Arg Cys Gln Arg Tyr
            35                  40

<210> SEQ ID NO 38
<211> LENGTH: 17
<212> TYPE: PRT
<213> ORGANISM: Artificial Sequence
<220> FEATURE:
<223> OTHER INFORMATION: CecropinA-Magainin2

<400> SEQUENCE: 38

```
Lys Trp Lys Leu Phe Lys Lys Ile Lys Phe Leu His Ser Ala Lys Lys
1               5                   10                  15

Phe

<210> SEQ ID NO 39
<211> LENGTH: 26
<212> TYPE: PRT
<213> ORGANISM: Artificial Sequence
<220> FEATURE:
<223> OTHER INFORMATION: Plantaricin A

<400> SEQUENCE: 39

Lys Ser Ser Ala Tyr Ser Leu Gln Met Gly Ala Thr Ala Ile Lys Gln
1               5                   10                  15

Val Lys Lys Leu Phe Lys Lys Trp Gly Trp
            20                  25

<210> SEQ ID NO 40
<211> LENGTH: 25
<212> TYPE: PRT
<213> ORGANISM: Artificial Sequence
<220> FEATURE:
<223> OTHER INFORMATION: Ocellatin-F1

<400> SEQUENCE: 40

Gly Val Val Asp Ile Leu Lys Gly Ala Ala Lys Asp Ile Ala Gly His
1               5                   10                  15

Leu Ala Ser Lys Val Met Asn Lys Leu
            20                  25

<210> SEQ ID NO 41
<211> LENGTH: 77
<212> TYPE: PRT
<213> ORGANISM: Artificial Sequence
<220> FEATURE:
<223> OTHER INFORMATION: PgD5

<400> SEQUENCE: 41

Met Glu Lys Arg Met Gly Ser Leu Ser Val Leu Phe Leu Leu Val
1               5                   10                  15

Leu Val Thr Ser Phe Glu Met Gln Val Glu Gly Arg Met Cys Glu Ser
            20                  25                  30

Gln Ser His Lys Phe Lys Gly Tyr Cys Ala Ser Ser Asn Cys Lys
        35                  40                  45

Val Val Cys Gln Thr Glu Lys Phe Leu Thr Gly Ser Cys Arg Asp Thr
    50                  55                  60

His Phe Gly Asn Arg Arg Cys Phe Cys Glu Lys Pro Cys
65                  70                  75

<210> SEQ ID NO 42
<211> LENGTH: 38
<212> TYPE: PRT
<213> ORGANISM: Artificial Sequence
<220> FEATURE:
<223> OTHER INFORMATION: TAP 20N

<400> SEQUENCE: 42

Asn Pro Val Ser Cys Val Arg Asn Lys Gly Ile Cys Val Pro Ile Arg
1               5                   10                  15

Cys Pro Gly Asn Met Lys Gln Ile Gly Thr Cys Val Gly Arg Ala Val
            20                  25                  30
```

```
Lys Cys Cys Arg Lys Lys
        35

<210> SEQ ID NO 43
<211> LENGTH: 25
<212> TYPE: PRT
<213> ORGANISM: Artificial Sequence
<220> FEATURE:
<223> OTHER INFORMATION: Androctonin

<400> SEQUENCE: 43

Arg Ser Val Cys Arg Gln Ile Lys Ile Cys Arg Arg Arg Gly Gly Cys
1               5                   10                  15

Tyr Tyr Lys Cys Thr Asn Arg Pro Tyr
            20                  25

<210> SEQ ID NO 44
<211> LENGTH: 34
<212> TYPE: PRT
<213> ORGANISM: Artificial Sequence
<220> FEATURE:
<223> OTHER INFORMATION: Adenoregulin

<400> SEQUENCE: 44

Gly Leu Trp Ser Lys Ile Lys Glu Val Gly Lys Glu Ala Ala Lys Ala
1               5                   10                  15

Ala Ala Lys Ala Ala Gly Lys Ala Ala Leu Gly Ala Val Ser Glu Ala
            20                  25                  30

Val Gln

<210> SEQ ID NO 45
<211> LENGTH: 30
<212> TYPE: PRT
<213> ORGANISM: Artificial Sequence
<220> FEATURE:
<223> OTHER INFORMATION: Cathelicidin-BF

<400> SEQUENCE: 45

Lys Phe Phe Arg Lys Leu Lys Lys Ser Val Lys Lys Arg Ala Lys Glu
1               5                   10                  15

Phe Phe Lys Lys Pro Arg Val Ile Gly Val Ser Ile Pro Phe
            20                  25                  30

<210> SEQ ID NO 46
<211> LENGTH: 37
<212> TYPE: PRT
<213> ORGANISM: Artificial Sequence
<220> FEATURE:
<223> OTHER INFORMATION: Cecropin A

<400> SEQUENCE: 46

Lys Trp Lys Leu Phe Lys Lys Ile Glu Lys Val Gly Gln Asn Ile Arg
1               5                   10                  15

Asp Gly Ile Ile Lys Ala Gly Pro Ala Val Ala Val Val Gly Gln Ala
            20                  25                  30

Thr Gln Ile Ala Lys
        35

<210> SEQ ID NO 47
<211> LENGTH: 47
<212> TYPE: PRT
<213> ORGANISM: Artificial Sequence
<220> FEATURE:
<223> OTHER INFORMATION: LcI
```

```
<400> SEQUENCE: 47

Ala Ile Lys Leu Val Gln Ser Pro Asn Gly Asn Phe Ala Ser Phe
1               5                   10                  15

Val Leu Asp Gly Thr Lys Trp Ile Phe Lys Ser Lys Tyr Tyr Asp Ser
            20                  25                  30

Ser Lys Gly Tyr Trp Val Gly Ile Tyr Glu Val Trp Asp Arg Lys
        35                  40                  45

<210> SEQ ID NO 48
<211> LENGTH: 58
<212> TYPE: PRT
<213> ORGANISM: Artificial Sequence
<220> FEATURE:
<223> OTHER INFORMATION: Reutericin-6

<400> SEQUENCE: 48

Ile Tyr Trp Ile Ala Asp Gln Phe Gly Ile His Leu Ala Thr Gly Thr
1               5                   10                  15

Ala Arg Lys Leu Leu Asp Ala Met Ala Ser Gly Ala Ser Leu Gly Thr
            20                  25                  30

Ala Phe Ala Ala Ile Leu Gly Val Thr Leu Pro Ala Trp Ala Leu Ala
        35                  40                  45

Ala Ala Gly Ala Leu Gly Ala Thr Ala Ala
    50                  55

<210> SEQ ID NO 49

<400> SEQUENCE: 49

000

<210> SEQ ID NO 50
<211> LENGTH: 313
<212> TYPE: PRT
<213> ORGANISM: Artificial Sequence
<220> FEATURE:
<223> OTHER INFORMATION: His-eGFP-10xAla-TEV-CecA

<400> SEQUENCE: 50

Met Gly Ser Ser His His His His His His Ser Ser Gly Leu Val Pro
1               5                   10                  15

Arg Gly Ser His Met Val Ser Lys Gly Glu Glu Leu Phe Thr Gly Val
            20                  25                  30

Val Pro Ile Leu Val Glu Leu Asp Gly Asp Val Asn Gly His Lys Phe
        35                  40                  45

Ser Val Ser Gly Glu Gly Glu Gly Asp Ala Thr Tyr Gly Lys Leu Thr
    50                  55                  60

Leu Lys Phe Ile Cys Thr Thr Gly Lys Leu Pro Val Pro Trp Pro Thr
65              70                  75                  80

Leu Val Thr Thr Leu Thr Tyr Gly Val Gln Cys Phe Ser Arg Tyr Pro
                85                  90                  95

Asp His Met Lys Gln His Asp Phe Phe Lys Ser Ala Met Pro Glu Gly
            100                 105                 110

Tyr Val Gln Glu Arg Thr Ile Phe Phe Lys Asp Asp Gly Asn Tyr Lys
        115                 120                 125

Thr Arg Ala Glu Val Lys Phe Glu Gly Asp Thr Leu Val Asn Arg Ile
    130                 135                 140

Glu Leu Lys Gly Ile Asp Phe Lys Glu Asp Gly Asn Ile Leu Gly His
```

```
145                 150                 155                 160
Lys Leu Glu Tyr Asn Tyr Asn Ser His Asn Val Tyr Ile Met Ala Asp
                165                 170                 175
Lys Gln Lys Asn Gly Ile Lys Val Asn Phe Lys Ile Arg His Asn Ile
            180                 185                 190
Glu Asp Gly Ser Val Gln Leu Ala Asp His Tyr Gln Gln Asn Thr Pro
        195                 200                 205
Ile Gly Asp Gly Pro Val Leu Leu Pro Asp Asn His Tyr Leu Ser Thr
    210                 215                 220
Gln Ser Ala Leu Ser Lys Asp Pro Asn Glu Lys Arg Asp His Met Val
225                 230                 235                 240
Leu Leu Glu Phe Val Thr Ala Ala Gly Ile Thr Leu Gly Met Asp Glu
                245                 250                 255
Leu Tyr Lys Ala Ala Ala Ala Ala Ala Ala Ala Ala Ala Glu Asn Leu
            260                 265                 270
Tyr Phe Gln Gly Lys Trp Lys Leu Phe Lys Lys Ile Glu Lys Val Gly
        275                 280                 285
Gln Asn Ile Arg Asp Gly Ile Ile Lys Ala Gly Pro Ala Val Ala Val
    290                 295                 300
Val Gly Gln Ala Thr Gln Ile Ala Lys
305                 310

<210> SEQ ID NO 51
<211> LENGTH: 323
<212> TYPE: PRT
<213> ORGANISM: Artificial Sequence
<220> FEATURE:
<223> OTHER INFORMATION: His-eGFP-10xAla-TEV-LCI

<400> SEQUENCE: 51

Met Gly Ser Ser His His His His His His Ser Ser Gly Leu Val Pro
1               5                   10                  15
Arg Gly Ser His Met Val Ser Lys Gly Glu Glu Leu Phe Thr Gly Val
            20                  25                  30
Val Pro Ile Leu Val Glu Leu Asp Gly Asp Val Asn Gly His Lys Phe
        35                  40                  45
Ser Val Ser Gly Glu Gly Glu Gly Asp Ala Thr Tyr Gly Lys Leu Thr
    50                  55                  60
Leu Lys Phe Ile Cys Thr Thr Gly Lys Leu Pro Val Pro Trp Pro Thr
65                  70                  75                  80
Leu Val Thr Thr Leu Thr Tyr Gly Val Gln Cys Phe Ser Arg Tyr Pro
                85                  90                  95
Asp His Met Lys Gln His Asp Phe Phe Lys Ser Ala Met Pro Glu Gly
            100                 105                 110
Tyr Val Gln Glu Arg Thr Ile Phe Phe Lys Asp Asp Gly Asn Tyr Lys
        115                 120                 125
Thr Arg Ala Glu Val Lys Phe Glu Gly Asp Thr Leu Val Asn Arg Ile
    130                 135                 140
Glu Leu Lys Gly Ile Asp Phe Lys Glu Asp Gly Asn Ile Leu Gly His
145                 150                 155                 160
Lys Leu Glu Tyr Asn Tyr Asn Ser His Asn Val Tyr Ile Met Ala Asp
                165                 170                 175
Lys Gln Lys Asn Gly Ile Lys Val Asn Phe Lys Ile Arg His Asn Ile
            180                 185                 190
Glu Asp Gly Ser Val Gln Leu Ala Asp His Tyr Gln Gln Asn Thr Pro
```

```
            195                 200                 205
Ile Gly Asp Gly Pro Val Leu Leu Pro Asp Asn His Tyr Leu Ser Thr
210                 215                 220

Gln Ser Ala Leu Ser Lys Asp Pro Asn Glu Lys Arg Asp His Met Val
225                 230                 235                 240

Leu Leu Glu Phe Val Thr Ala Ala Gly Ile Thr Leu Gly Met Asp Glu
                245                 250                 255

Leu Tyr Lys Ala Ala Ala Ala Ala Ala Ala Ala Ala Ala Glu Asn Leu
            260                 265                 270

Tyr Phe Gln Gly Ala Ile Lys Leu Val Gln Ser Pro Asn Gly Asn Phe
            275                 280                 285

Ala Ala Ser Phe Val Leu Asp Gly Thr Lys Trp Ile Phe Lys Ser Lys
290                 295                 300

Tyr Tyr Asp Ser Ser Lys Gly Tyr Trp Val Gly Ile Tyr Glu Val Trp
305                 310                 315                 320

Asp Arg Lys
```

<210> SEQ ID NO 52
<211> LENGTH: 20
<212> TYPE: PRT
<213> ORGANISM: Artificial Sequence
<220> FEATURE:
<223> OTHER INFORMATION: His-tag

<400> SEQUENCE: 52

```
Met Gly Ser Ser His His His His His His Ser Ser Gly Leu Val Pro
1               5                   10                  15

Arg Gly Ser His
            20
```

<210> SEQ ID NO 53
<211> LENGTH: 239
<212> TYPE: PRT
<213> ORGANISM: Artificial Sequence
<220> FEATURE:
<223> OTHER INFORMATION: eGFP

<400> SEQUENCE: 53

```
Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
```

```
                145                 150                 155                 160
Gly Ile Lys Val Asn Phe Lys Ile Arg His Asn Ile Glu Asp Gly Ser
                    165                 170                 175

Val Gln Leu Ala Asp His Tyr Gln Gln Asn Thr Pro Ile Gly Asp Gly
                    180                 185                 190

Pro Val Leu Leu Pro Asp Asn His Tyr Leu Ser Thr Gln Ser Ala Leu
                    195                 200                 205

Ser Lys Asp Pro Asn Glu Lys Arg Asp His Met Val Leu Leu Glu Phe
                    210                 215                 220

Val Thr Ala Ala Gly Ile Thr Leu Gly Met Asp Glu Leu Tyr Lys
225                 230                 235

<210> SEQ ID NO 54
<211> LENGTH: 10
<212> TYPE: PRT
<213> ORGANISM: Artificial Sequence
<220> FEATURE:
<223> OTHER INFORMATION: spacer

<400> SEQUENCE: 54

Ala Ala Ala Ala Ala Ala Ala Ala Ala Ala
1               5                   10

<210> SEQ ID NO 55
<211> LENGTH: 7
<212> TYPE: PRT
<213> ORGANISM: Artificial Sequence
<220> FEATURE:
<223> OTHER INFORMATION: TEV-Schnittstelle

<400> SEQUENCE: 55

Glu Asn Leu Tyr Phe Gln Gly
1               5

<210> SEQ ID NO 56
<211> LENGTH: 47
<212> TYPE: PRT
<213> ORGANISM: Artificial Sequence
<220> FEATURE:
<223> OTHER INFORMATION: LCI WT

<400> SEQUENCE: 56

Ala Ile Lys Leu Val Gln Ser Pro Asn Gly Asn Phe Ala Ala Ser Phe
1               5                   10                  15

Val Leu Asp Gly Thr Lys Trp Ile Phe Lys Ser Lys Tyr Tyr Asp Ser
                20                  25                  30

Ser Lys Gly Tyr Trp Val Gly Ile Tyr Glu Val Trp Asp Arg Lys
            35                  40                  45

<210> SEQ ID NO 57
<211> LENGTH: 47
<212> TYPE: PRT
<213> ORGANISM: Artificial Sequence
<220> FEATURE:
<223> OTHER INFORMATION: LCI KR1

<400> SEQUENCE: 57

Ala Ile Lys Leu Val Gln Ser Leu Asn Gly Asn Phe Ala Ala Arg Phe
1               5                   10                  15

Val Leu Asp Gly Thr Lys Trp Ile Phe Lys Cys Lys Tyr Tyr Asp Ser
                20                  25                  30

Ser Lys Gly Tyr Trp Val Gly Ile Tyr Glu Val Trp Gly Arg Lys
```

```
                    35                  40                  45

<210> SEQ ID NO 58
<211> LENGTH: 47
<212> TYPE: PRT
<213> ORGANISM: Artificial Sequence
<220> FEATURE:
<223> OTHER INFORMATION: LCI KR2

<400> SEQUENCE: 58

Ala Ile Arg Leu Val Gln Ser Gln Lys Cys Asn Phe Ala Ala Ser Phe
1               5                   10                  15

Val Leu Gly Gly Thr Lys Trp Thr Phe Lys Gly Lys Tyr Tyr Asp Ser
            20                  25                  30

Ser Lys Asp Tyr Trp Val Gly Ile Tyr Glu Val Arg Val Arg Lys
        35                  40                  45

<210> SEQ ID NO 59
<211> LENGTH: 47
<212> TYPE: PRT
<213> ORGANISM: Artificial Sequence
<220> FEATURE:
<223> OTHER INFORMATION: LCI KR3

<400> SEQUENCE: 59

Ala Ile Lys Gln Val Gln Ser Pro Asn Gly Asn Phe Ala Ala Ser Phe
1               5                   10                  15

Val Leu Asp Gly Thr Lys Trp Ile Phe Lys Ser Lys Tyr Tyr Asp Ser
            20                  25                  30

Ser Arg Gly Tyr Trp Val Gly Ile Tyr Val Val Trp Asp Arg Lys
        35                  40                  45

<210> SEQ ID NO 60
<211> LENGTH: 47
<212> TYPE: PRT
<213> ORGANISM: Artificial Sequence
<220> FEATURE:
<223> OTHER INFORMATION: LCI KR4

<400> SEQUENCE: 60

Ala Ile Lys Leu Val His Ser Pro Asn Gly Asn Phe Ala Ala Ser Phe
1               5                   10                  15

Val Leu Asp Gly Thr Lys Trp Ile Phe Lys Ser Lys Phe Tyr Asp Ser
            20                  25                  30

Ser Lys Gly Tyr Trp Val Gly Thr Tyr Glu Val Trp Ala Arg Lys
        35                  40                  45
```

PLANT PROTECTION AND/OR PLANT GROWTH PROMOTION SYSTEM

CROSS-REFERENCE TO RELATED APPLICATIONS

This application is a national stage application (under 35 U.S.C. § 371) of PCT/EP2015/080922, filed Dec. 22, 2015, which claims benefit of German Application No. 10 2015 203 317.1, filed Feb. 24, 2015, which are incorporated herein by reference in their entireties.

The present invention relates to a plant protection and/or plant growth promotion system, comprising at least one anchor peptide for binding to a plant part, a support function, which is indirectly or directly bound to the anchor peptide, and at least one active substance for protecting the plant and/or promoting plant growth. The present invention further relates to the use of a plant protection and/or plant growth promotion system according to the present invention for immobilizing an active substance for protecting the plant and/or promoting plant growth. Additionally, the present invention relates to a method for protecting plants and/or promoting plant growth, wherein the plant protection and/or plant growth promotion system according to the present invention is applied to a plant.

Due to an increasing world population there is an increased demand for foodstuffs and other plant products. At the same time, the introduction of fertilizers and plant protection product poses an increasing pollution of soils, ground water and the environment. In addition, it is desirable, also for cost reasons, to control the use of plant protection and plant growth promoters in such a way that they are used as specifically as possible, such that in fact only quantities as small as possible are required. Additionally, an oversupply of certain agents cannot be beneficial for plant protection or plant growth.

Antimicrobial peptides are known in the prior art, for example from Yeaman, M. R. and Yount N. Y. (2003), *Pharmacol Rev.* 55: 27, pages 27 to 55.

Furthermore, anchor peptides, which can impart an improved binding to certain surfaces, are known in the prior art; cf., Muhammad N, Dworeck T, Schenk A, Shinde P, Fioroni M, Schwaneberg U. (2012). *Polymersome surface decoration by an EGFP fusion protein employing Cecropin A as peptide "anchor"*. J Biotechnol., 2012, Jan. 31-37.

However, in the prior art, there is no system known with which, flexibly adapted to a large number of plant surfaces, means for positively influencing the plant health and/or the plant growth can be applied reliably and, in particular, with an increased adhesion time against rain.

In this context, it is an objective of the present invention to provide a system for plant protection and/or plant growth promotion, with which the active substances intended for the plant can be applied onto plants with an improved adhesion.

This objective is solved by a plant protection and/or plant growth promotion system, comprising at least one anchor peptide for increased binding to a plant part, a support function, which is indirectly or directly bound to the anchor peptide, and an active substance for protecting the plant and/or promoting plant growth, in particular the yield.

In the context of the present application, plant protection is understood as meaning all measures which protect a plant against a disease and/or pests. In addition, also the protection against abiotic stress such as dryness can be understood under the term plant protection.

Plant growth promotion is understood as meaning any measure that supports a plant to produce more biomass. This applies in particular to an increase in the yield of crops.

In the context of the present application, an anchor peptide is a polypeptide (including an oligopeptide), which causes an increased binding of the residual molecule attached to it to a plant part.

Preferred anchor peptides are, in particular, amphiphilic chain segments having sizes of from 2 to 300, more preferably from 10 to 200, particularly preferably from 15 to 150, amino acids, which can be highly diverse in view of their structure and composition. Preferred structures are alpha helix, beta sheet and/or regions with an increased number of specific amino acids, in particular proline or tyrosine and/or a combination of alpha helix and beta sheet structures.

An increased binding in the context of the present invention is a binding that causes that in a wash-off test according to Example 1 at least 50%, preferably at least 60%, more preferably at least 70%, even more preferably at least 80%, most preferably at least 90%, more of the applied active substance (see also below) remains on a plant or a plant part than of the same active substance applied without the anchor peptide. The percentages relate to the number of active substance molecules.

In the context of the present application, a support function is a region of the plant protection and/or plant growth promotion system according to the present invention that does neither have a binding function to the target structure of the plant nor a function of an active substance.

In the context of the present application, an active substance is a natural or synthetic compound, a biological system up to a microorganism, which in each case exerts an effect on the growth and/or health of the plant. In the context of the present application, the active substance is directly bound to the support function, wherein the bond can be in the form of a chemical or a physical bond. In the context of the present application, the term physical bond does also include a case where the active substance is encapsulated by the support function.

Thus, the solution according to the present invention represents an at least three-part system. The anchor peptide serves to bind the active substance to the plant. In this way, the residence time of the active substance on the plant is increased. Additionally, by selecting an appropriate anchor peptide, it is possible to determine the precise site of action on the plant, for example the plant part. Thus, it is possible to select the anchor peptide for certain plants and plant parts, just like a building block system. Such a selection is possible for the skilled person by means of known anchor peptides and by means of a corresponding adaptation of the polypeptide chain for the anchor peptide to the desired purpose. Preferably, the anchor peptide is designed to bind to a hydrophobic surface of a plant. In this context, hydrophobic surface means, in case of doubt, that a water droplet on a hydrophobic surface has a contact angle of $\geq 65°$, preferably $\geq 70°$, more preferably $\geq 75°$, even more preferably $\geq 80°$, even more preferably $\geq 85°$, most preferably $\geq 90°$, in a static measurement.

The support function serves to connect the active substance with the anchor peptide and, optionally, to immobilize it. Also the support function can be adapted according to the requirements of the applied system according to the invention. This applies both to the active substance, to the binding to the anchor peptide, and to the desired mode of action of the active compound. Thus, as an example, it may be desirable that the active substance remains at a certain distance from the plant surface. This applies, in particular, to active substances which are intended to repel harmful organisms. The support function regularly separates the function of anchor peptide and active substance spatially.

In the context of the present application, it is preferred that the anchor peptide consists of 2 to 300 amino acids, more preferably 2 to 250, even more preferably 2 to 180, even more preferably 5 to 140 and particularly preferably 10 to 100 amino acids. In this context, particularly preferred anchor peptides are peptide sequences corresponding to sequences SEQ 1 to 48 or sequences having a match of at least 30%, preferably at least 50%, preferably at least 65%, preferably at least 75%, preferably at least 80%, more preferably at least 90% with the sequences SEQ 1 to 48.

Preferably, the anchor peptide encompasses those amino acids which are provided at the end of the plant protection and/or plant growth promotion system according to the invention (which is preferably unbranched) that is opposite from the active substance. In the context of the present invention, the amino acids of the anchor peptide encompass all amino acids at this end up to the last amino acid which binds to the plant part. If non-binding amino acids (i.e., those which do not participate in the binding process to the plant) are present behind the abovementioned amino acid (that is to say directed away from the active substance in the amino acid chain), for example in the form of loops or the like, it is, within the meaning of the present invention, preferred that these non-binding chain segments are not counted to the total number of amino acids of the anchor peptide when the non-binding chain consists of at least 15 consecutive amino acids that are not in contact with the plant surface.

Preferred is a plant protection and/or plant growth promotion system according to the invention, wherein the active substance is selected from the group consisting of
- pesticide, in particular acaricide, ovicide, insecticide, molluscicide, nematicide, rodenticide and/or avicide,
- herbicide, in particular algicide, graminicide and/or arboricide,
- bactericide,
- fungicide,
- safener
- beneficial organisms, in particular beneficial bacteria (e.g., plant growth-promoting rhizobacteria such as *bacillus* types) and beneficial fungi (e.g., *trichoderma* types, myccorhiza fungi) that colonize the plant roots and/or grow in the rhizosphere and which, optionally, have a positive effect on the resistance, the disease resistance, the growth and/or the yield of plants.
- means for promoting plant growth and/or colonization of beneficial organisms, and
- plant growth agents, in particular nutrients or hormones.

Particularly preferred active substances for the present invention are strobilurin fungicides, azoles, succinate dehydrogenase inhibitors and antimicrobial peptides, in particular thanatin, osmotin, dermaseptin SI, metcheninkowin, defensines and antimicrobial proteins, in particular pathogenesis-related (PR) proteins, osmotin, phylloplanine or GDSL-lipases.

Preference is given to a plant protection and/or plant growth promotion system according to the invention, wherein the support function is selected from the group consisting of nanogel, microgel, polysome, polymerosome, synthosome, poly-amino acid-spacer, colloidosome and cubosome.

The support function can directly and indirectly be bound to the anchor peptide. If the support function is a nanogel/microgel, it is preferred that the support function is indirectly bound to the anchor peptide. This means, that it is preferred that in such cases, a further spacer is applied.

In the context of the present application, a spacer is an (additional) element (preferably a polypeptide chain), which provides for a spacing between the support function and the anchor peptide. Preferably, a spacer is designed in the form of a rigid alpha helix. More preferably, such a spacer is a polyalanine.

As described above, the active substance is physically or chemically bound to the support function. Preferably, the support function is represented by a nanogel or a microgel. Nanogels and microgels are cross-linked polymer particles that are swollen in water. Nanogels contain particles in a size of 50 nm to 200 nm (based on the statistical average of the particle size, wherein, in case of doubt, the largest diameter is considered for the size determination for non-spherical particles). In the context of the present application, microgels have a particle size of >200 nm to 50 μm, also based on the statistical average, wherein the largest diameter is considered for the size determination for non-spherical particles.

Particularly preferred supports for the present invention are microgels having a particle size (statistical average, determined as described above) with a particle size of 1 μm to 10 μm. Such particularly preferred microgels are readily manageable in their preparation and provide sufficient capacity for active substances for the plant protection and/or plant growth promotion system according to the invention. Microgels have specific properties due to their porous open structure and water-solvated polymer chains that can react to external stimuli (such as temperature, pH, or light). pH responsive microgels have acidic or basic groups in their polymer chains. Depending on the pH, these groups are reversibly protonated/deprotonated and lead to volume changes of the gels. This function allows the pH-triggered release of ions or molecules from the gels.

Basic classical release systems of microgels are capsules. Other release systems are, e.g., vesicles, colloidosomes or cubosomes.

Preferred is a plant protection and/or plant growth promotion system according to the present invention, wherein the anchor peptide binds to the leaf, trunk, stem, root, fruit, in particular seeds, bud, blossom and/or tuber of a plant. In this context, it is preferred that the anchor peptide binds to one of these plant parts by at least 10%, preferably 20%, and particularly preferably 30%, stronger than to other plant parts. In this context, "binds stronger" means that in the wash-off test according to Example 1 less active substance is washed off from the target plant part than from all other plant parts, according to the stated percentages.

Preferred is a plant protection and/or plant growth promotion system according to the present invention, wherein the support function is a nano- or microgel and is configured such that the active substance either remains on the support or is directly, time delayed and/or stimulation dependently released. A time delayed and/or stimulation dependent release is particularly preferred.

As regards the application of nano- or microgels, it is—as indicated above—state of the art to design these gels in such a way that they can react to certain stimuli. Preferred stimuli, to which the micro- or nanogels can react, are abiotic parameters such as pH, temperature, humidity, light (including UV light), duration of irradiation, electric pulses or magnetic pulses and biotic factors such as elicitors, enzymatic reactions, microbe associated molecular patterns, pathogen associated molecular patterns, damage associated molecular patterns, and herbivore associated molecular patterns.

Preferred is a plant protection and/or plant growth promotion system according to the present invention, wherein the system is a fusion protein.

In the case of a fusion protein, the anchor peptide, the support function and preferably also the active substance would each consist of peptides. As indicated above, a number of (poly) peptides are known in the prior art, which have, for example, antimicrobial properties. Such a fusion protein would have the advantage that it can be easily produced industrially and, in particular, can have an effect which does not have an adverse effect on the environment.

Preference is given to a plant protection and/or plant growth promotion system according to the present invention, in particular in the form of a fusion protein, wherein the support function is a chain of 2 to 100 amino acids, preferably 5 to 50 amino acids, which are designed as spacers.

Part of the present invention is also the use of a plant protection and/or plant growth promotion system according to the present invention for the immobilization of an active substance for protecting the plant and/or for promoting plant growth.

In the context of the present invention, immobilization is to be understood as a binding to the plant in the sense of the above-described definition.

Part of the present invention is also a method for protecting plants and/or promoting plant growth, comprising the following steps:
a) providing a plant protection and/or plant growth promotion system according to the present invention and
b) applying the plant protection and/or plant growth promotion system onto a plant.

EXAMPLES

Example 1—Wash-Off Test

The wash-off test is used to test whether the anchor peptide provides for an improved binding of the plant protection and/or plant growth promoting system according to the present invention:

1. The plant protection and/or plant growth promotion system to be tested (sample) and molecules of the same composition but without the section of the anchor peptide being present (comparative sample), are provided.
2. Procedure
   a) An incubation is carried out for five minutes at room temperature on the plant part to be tested for the sample and the comparative sample.
   b) Subsequently, it is washed with Tris/HCl buffer 50 mM Tris/HCl buffer, pH 8.0 for three times for five minutes each.
   c) Subsequently, the concentration of the sample and the comparative sample on the respective plant part is determined using a suitable detection method.

An improved binding within the meaning of the present invention is at least present, when at least 50% more of the sample remains on the plant than of the comparative sample. If necessary, the test plant is, in case of doubt, a soybean plant (*Glycine max*) or a corn plant (*Phocea*) or wheat (*Triticum* L).

Preferably, the above-mentioned soybean plant and the corn plant are the test plants (as examples for single and dicotyledonous plants).

In case of doubt, all plant parts of the comparative plant are tested to determine whether there is an increased binding to one of the plant parts. Here, in particular, the following plant parts are to be mentioned: leaf, leaf stem, trunk, stem, root, fruit, bud and blossom.

Preferably, an increased binding in the sense of the present invention is present when the sample, compared to comparative sample, is washed off in the wash-off test from at least one of said plant parts by at least 50% less.

Example 2—Preferred Anchor Peptides

TABLE 1

Possible anchor peptide sequences:

| Peptide | Amino acid sequence | |
|---|---|---|
| Antifungal protein 1 | AGCIKNGGRCNASAGPPYCCSSYCFQIAGQSYGVCKNR | SEQ 1 |
| Cg-Def | GFGCPGNQLKCNNHCKSISCRAGYCDAATLWLRCTCTD CNGKK | SEQ 2 |
| Dermaseptin DA4 | GMWSKIKNAGKAAKAAAKAAGKAALGAVSEAM | SEQ 3 |
| Defensin | VTCDLLSFEAKGFAANHSLCAAHCLAIGRRGGSCERGVC ICRR | SEQ 4 |
| hDermcidin | SSLLEKGLDGAKKAVGGLGKLGKDAVEDLESVGKGAVH DVKDVLDSV | SEQ 5 |
| Pelovaterin | DDTPSSRCGSGGWGPCLPIVDLLCIVHVTVGCSGGFGC CRIG | SEQ 6 |
| Thanatin | GSKKPVPIIYCNRRTGKCQRM | SEQ 7 |
| Androctonin | RSVCRQIKICRRGGCYYKCTNRPY | SEQ 8 |
| TAP_20_N | NPVSCVRNKGICVPIRCPGNMKQIGTCVGRAVKCCRKK | SEQ 9 |

TABLE 1-continued

Possible anchor peptide sequences:

| Peptide | Amino acid sequence | |
|---|---|---|
| PgD5 | MEKRMGSLSVLFLLLVLVTSFEMQVEGRMCESQSHKFK GYCASSSNCKVVCQTEKFLTGSCRDTHFGNRRCFCEKP C | SEQ 10 |
| Alpha-purothionin | KSCCRSTLGRNCYNLCRARGAQKLCAGVCRCKISSGLS CPKGFPK | SEQ 11 |
| Carnobacter-iocin B2 | VNYGNGVSCSKTKCSVNWGQAFQERYTAGINSFVSGVA SGAGSIGRRP | SEQ 12 |
| MMGP1 | MLWSASMRIFASAFSTRGLGTRMLMYCSLPSRCWRK | SEQ 13 |
| Macaque histatin | DSHEERHHGRHGHHKYGRKFHEKHHSHRGYRSNYLYD N | SEQ 14 |
| MiAMP1 | SAFTVWSGPGCNNRAERYSKCGCSAIHQKGGYDFSYTG QTAALYNQAGCSGVAHTRFGSSARACNPFGWKSIFIQC | SEQ 15 |
| MBP-1 | RSGRGECRRQCLRRHEGQPWETQECMRRCRRG | SEQ 16 |
| RNase 7 | KPKGMTSSQWFKIQHMQPSPQACNSAMKNINKHTKRCK DLNTFLHEPFSSVAATCQTPKIACKNGDKNCHQSHGAVS LTMCKLTSGKYPNCRYKEKRQNKSYVVACKPPQKKDSQ QFHLVPVHLDRVL | SEQ 17 |
| Shepherin I | GYGGHGGHGGHGGHGGHGHGGGHG | SEQ 18 |
| Snakin-1 | GSNFCDSKCKLRCSKAGLADRCLKYCGICCEECKCVPS GTYGNKHECPCYRDKKNSKGKSKCP | SEQ 19 |
| Stomoxyn | RGFRKHFNKLVKKVKHTISETAHVAKDTAVIAGSGAAVVA AT | SEQ 20 |
| VarvF | GVPICGETCTLGTCYTAGCSCSWPVCTRN | SEQ 21 |
| VrD1 | RTCMIKKEGWGKCLIDTTCAHSCKNRGYIGGNCKGMTR TCYCLVNC | SEQ 22 |
| European bumblebee abaecin | FVPYNPPRPYQSKPFPSFPGHGPFNPKIQWPYPLPNPG H | SEQ 23 |
| Papiliocin | RWKIFKKIEKVGRNVRDGIIKAGPAVAVVGQAATVVK | SEQ 24 |
| BM Moricin | AKIPIKAIKTVGKAVGKGLRAINIASTANDVFNFLKPKKRKA | SEQ 25 |
| Carnocyclin A | LVAYGIAQGTAEKVVSLINAGLTVGSIISILGGVTVGLSGVF TAVKAAIAKQGIKKAIQL | SEQ 26 |
| Curvacin A | ARSYGNGVYCNNKKCWVNRGEATQSIIGGMISGWASGL AGM | SEQ 27 |
| Lactoferricin B | FKCRRWQWRMKKLGAPSITCVRRAF | SEQ 28 |
| Magainin 2 | GIGKFLHSAKKFGKAFVGEIMNS | SEQ 29 |
| Pleurocidin | GWGSFFKKAAHVGKHVGKAALTHYL | SEQ 30 |
| Psoriasin | MSNTQAERSIIGMIDMFHKYTRRDDKIDKPSLLTMMKENF PNFLSACDKKGTNYLADVFEKKDKNEDKKIDFSEFLSLLG DIATDYHKQSHGAAPCSGGSQ | SEQ 31 |
| Spinigerin | HVDKKVADKVLLLKQLRIMRLLTRL | SEQ 32 |
| Acanthoscurrin 1 | DVYKGGGGGRYGGGRYGGGGYGGGLGGGGLGGGG LGGGKGLGGGGLGGGGLGGGGLGGGGLGGGKGLGGG GLGGGGLGGGGLGGGKGLGGGGLGGGGLGGG RGGGYGGGGGYGGGYGGGYGGGKYKG | SEQ 33 |
| ALF-L | DGIWTQLIFTLVKNLATLWQSGDFQFLDHECHYRIKPTFR RLKWKYKGKFWCPSWTSITGRATKSSRSGAVEHSVRNF VGQAKSSGLITQRQAEQFISQYN | SEQ 34 |

TABLE 1-continued

Possible anchor peptide sequences:

| Peptide | Amino acid sequence | |
|---|---|---|
| BDEF_TACTR | NPLIPAIYIGATVGPSVWAYLVALVGAAAVTAANIRRASSDNHSCAGNRGWCRSKCFRHEYVDTYYSAVCGRYFCCRSR | SEQ 35 |
| PP102 | GSCSCSGTISPYGLRTCRATKTKPSHPTTKETHPQTLPT | SEQ 36 |
| Tachystatin A2 | YSRCQLQGFNCVVRSYGLPTIPCCRGLTCRSYFPGSTYGRCQRY | SEQ 37 |
| CecropinA-Magainin2 | KWKLFKKIKFLHSAKKF | SEQ 38 |
| Plantaricin A | KSSAYSLQMGATAIKQVKKLFKKWGW | SEQ 39 |
| Ocellatin-F1 | GVVDILKGAAKDIAGHLASKVMNKL | SEQ 40 |
| PgD5 | MEKRMGSLSVLFLLLVLVTSFEMQVEGRMCESQSHKFKGYCASSSNCKVVCQTEKFLTGSCRDTHFGNRRCFCEKPC | SEQ 41 |
| TAP 20N | NPVSCVRNKGICVPIRCPGNMKQIGTCVGRAVKCCRKK | SEQ 42 |
| Androctonin | RSVCRQIKICRRRGGCYYKCTNRPY | SEQ 43 |
| Adenoregulin | GLWSKIKEVGKEAAKAAAKAAGKAALGAVSEAVQ | SEQ 44 |
| Cathelicidin-BF | KFFRKLKKSVKKRAKEFFKKPRVIGVSIPF | SEQ 45 |
| Cecropin A | KWKLFKKIEKVGQNIRDGIIKAGPAVAVVGQATQIAK | SEQ 46 |
| Lcl | AIKLVQSPNGNFAASFVLDGTKWIFKSKYYDSSKGYWVGIYEVWDRK | SEQ 47 |
| Reutericin-6 | IYWIADQFGIHLATGTARKLLDAMASGASLGTAFAAILGVTLPAWALAAAGALGATAA | SEQ 48 |

The anchor peptides mentioned are particularly suitable for the plant protection and/or growth promotion systems according to the invention. In this case, the binding of the anchor peptide to the residual molecule (in particular directly or indirectly to the support) is carried out by a skilled person according to the prior art.

Example 3

General Protocol for the Expression of a Plant Protection and/or Plant Growth Promotion System According to the Invention in the Form of a Fusion Protein:
Principle: Expression of Fusion Proteins in Small Amounts The gene encoding the plant protection and/or plant growth promotion system according to the invention, including the anchor peptide, is introduced into a pET28 expression vector. The expression strain is *E. coli* Bl21-Gold.
Procedure:
1. Plating the *E. coli* on an agar plate. Growth overnight at 37° C.
2. Extracting a single colony from the plate to inoculate a pre-culture of 10 mL of LBKan medium, incubating overnight at 37° C. with 200 rpm.
3. Preparing 10 mL of TB-medium (80 mL solution A+20 mL solution B) per strain, adding Kanamycin.
4. Checking the $OD_{600}$ of the pre-culture; inoculating the main culture with x ml pre-culture, $x=2.5/OD_{pre-culture}$
5. Checking the $OD_{600}$ of the main culture (aim: at least 0.025).
6. Incubating the main culture at 37° C., 200 rpm, for 4 hours.
7. Adding 100 μL 0.1 M IPTG.
8. Incubating the main culture at 16° C., 200 rpm, for 48 hours.
9. Harvesting the cells by means of centrifugation, 30 min at 4° C., 4000 rpm (Eppendorf 5810 R)
10. The cells can be stored at −20° C. until their use.

The chemicals are obtained from Sigma Aldrich.
The used solutions are, in detail:
LB-medium: Trypton (10 g/L), yeast extract (5 g/L) NaCl (10 g/L)

The LB-medium is autoclaved for twenty minutes at 121° C.

For 100 mL LB-medium of the pre-culture (LBKan), 100 μL sterile filtrated Kanamycinsulfate (100 mg/mL in ddH2O) were added.
TB-Medium:
Solution A:

Peptone 12 g, yeast extract 24 g, glycerol 4 g, filled up to 800 mL with $dH_2O$ and autoclaved at 121° C. for 20 minutes.
Solution B:

$K_2HPO_4$ (12.5 g) and $KH_2PO_4$ (2.31 g) were filled up to 200 mL with $dH_2O$ and were autoclaved at 121° C. for 20 minutes.

For the preparation of TB-medium with Kanamycin (TB-kan), 100 μL sterile filtrated Kanamycinsulfate (100 mg/mL in ddH2O) were added to 200 mL TB-medium.

Example 4—Purification of Fusion Proteins

By means of affinity chromatography, proteins are separated on the basis of a reversible interaction between a protein and a specific ligand bound to a chromatography matrix. This technique provides high selectivity, high resolution and usually a large capacity for the protein of interest. The technique can be used to separate active biomolecules from denatured or functionally altered forms or to isolate pure substances that are present in low concentration in large volumes of raw samples or to remove specific impurities.

Procedure:
1. A cell pellet (for example one of Example 3) is taken up with buffer A (see below), which has been admixed with 0.1 mM PMSF and 0.1 mM DTT just before use. 6 mug cells are used.
2. The cell disintegration is performed in a high-pressure homogenizer, 3 times at 1500 bar.
3. Subsequently, it is centrifuged for 15 min at 4° C. and 4000 rpm.
4. It follows a centrifugation for 30 min at 4° C. and 10000 rpm (Sorvall centrifuge). If the supernatant is not clear, it is again centrifuged for 15 min at the same conditions.
5. Subsequently, the supernatant is filtered with 0.45 μm cellulose acetate-membrane filters (not sterile) (VWR).
6. It follows a purification via His-tag using ÄKTA prime and a NiNTA column (5 mL).
7. Equilibration of the column:
    The column is washed for 5 times with ddH2O
    Tube B is filled with buffer B (see below)
    Tube A is filled with buffer A and then washed into the column with 2 bed volume buffer A (0% buffer B)
8. Application of the clear supernatant:
    A flow rate of 2 mL/min at a maximum pressure of 0.6 MPa is set
    The column is equilibrated with buffer A
    The starting gradient is 100 mL 0-50% buffer B
    The eluates are collected in 2-5 mL fractions
    The fractions are checked via SDS-Page
    It is dialyzed against buffer C at 4° C. for 24 hours
    The purity is determined via SDS-Page and the concentration is determined via BCA-assay
    0.1 mM PMSF, 0.1 mM DTT und EDTA—solution are added
    Optionally, the solution is frozen at −20° C.
    and, optionally, subsequently lyophilized
    The lyophilized fusion protein can be stored at −20° C.
Note: The chemicals are supplied by Sigma Aldrich, ÄKTA prime was used.

Solutions:
Buffer A (50 mM Tris-buffer, 5 mM imidazole, pH 8.0): 4.44 g/L Tris HCl, 2.65 g/L Tris-base und 0.34 g/L imidazole are diluted with dH2O.
Buffer B (50 mM Tris-buffer, 500 mM imidazole, pH 8.0): 4.44 g/L Tris HCl and 2.65 g/L Tris-Base und 34.04 g/L imidazole are mixed in dH2O.
Buffer C (50 mM Tris-buffer, pH 8.0): 4.44 g/L Tris HCl and 2.65 g/L Tris-base are diluted with dH2O.

Example 5

Mode II for a Plant Protection and/or Plant Growth Promotion System According to the Invention:

For improved detectability, the active substance (e.g., an antimicrobial peptide) is replaced by eGFP in this model.

FIG. 1 schematically shows the polypeptide chain of a fusion protein according to the invention.

The plant protection and/or plant growth promotion system according to the invention consists of a His-tag for the purification (optional), a part of green fluorescent protein (eGFP) as a model for the active substance and for a simple detection of the support function in the form of a 10× Alanine spacer with an optional protease cleavage site (TEV) (10×Ala-TEV) as well as the anchor peptide, either Cecropion A (CecA) or LCI.

The corresponding amino acid sequences are as follows:

```
SEQ 50: His-eGFP-10xAla-TEV-CecA
MGSSHHHHHHSSGLVPRGSHMVSKGEELFTGVVPILVELDGDVNGHKFSV
SGEGEGDATYGKLTLKFICTTGKLPVPWPTLVTTLTYGVQCFSRYPDHMK
QHDFFKSAMPEGYVQERTIFFKDDGNYKTRAEVKFEGDTLVNRIELKGID
FKEDGNILGHKLEYNYNSHNVYIMADKQKNGIKVNFKIRHNIEDGSVQLA
DHYQQNTPIGDGPVLLPDNHYLSTQSALSKDPNEKRDHMVLLEFVTAAGI
TLGMDELYKAAAAAAAAAAENLYFQGKWKLFKKIEKVGQNIRDGIIKAGP
AVAVVGQATQIAK

SEQ 51: His-eGFP-10xAla-TEV-LCI
MGSSHHHHHHSSGLVPRGSHMVSKGEELFTGVVPILVELDGDVNGHKFSV
SGEGEGDATYGKLTLKFICTTGKLPVPWPTLVTTLTYGVQCFSRYPDHMK
QHDFFKSAMPEGYVQERTIFFKDDGNYKTRAEVKFEGDTLVNRIELKGID
FKEDGNILGHKLEYNYNSHNVYIMADKQKNGIKVNFKIRHNIEDGSVQLA
DHYQQNTPIGDGPVLLPDNHYLSTQSALSKDPNEKRDHMVLLEFVTAAGI
TLGMDELYKAAAAAAAAAAENLYFQGAIKLVQSPNGNFAASFVLDGTKWI
FKSKYYDSSKGYWVGIYEVWDRK

The SEQ 52
MGSSHHHHHHSSGLVPRGSH represents the His-tag,

The SEQ 53 MVSKGEELFTGVVPILVELDGDVNGHKFSVSGEGEGDAT
YGKLTLKFICTTGKLPVPWPTLVTTLTYGVQCFSRYPDHMKQHDFFKSAM
PEGYVQERTIFFKDDGNYKTRAEVKFEGDTLVNRIELKGIDFKEDGNILG
HKLEYNYNSHNVYIMADKQKNGIKVNFKIRHNIEDGSVQLADHYQQNTPI
GDGPVLLPDNHYLSTQSALSKDPNEKRDHMVLLEFVTAAGITLGMDELYK
represents the eGFP The SEQ 54 AAAAAAAAAA represents the alanine
spacer and the SEQ 55 ENLYFQG represents the TEV-cleavage
site. The remainder of the sequence is the CecA -
or the LCI sequence (cf., Example 2).
```

Example 6

Application Example of the Model Fusion Protein:

The DNA sequence for the model fusion protein was inserted into a pET28 expression vector and expressed according to Example 3. After obtaining and purifying the fusion proteins (cf., Example 4), they were applied to soya leaves.

The fusion protein according to SEQ 51 (LCl-eGFP) was used as sample in a concentration of 1 mg/mL and the same sequence without the anchor peptide sequence, also expressed according to Example 3, was used as comparative sample. The comparative sample was also applied in a concentration of 1 mg/mL.

The incubation was carried out according to the wash-off test, cf., Example 1. After carrying out the wash-off test according to Example 1, a large number of fluorescence signals were observed in the fluorescence microscope only on the soybean leaf treated with the sample (model fusion protein), whereas fluorescence was no longer detectable on the leaf treated with the comparative sample.

Example 7

Example for Binding Anchor Peptide Sequences with a Sequence Variance of the LCl Sequence:

```
(LCI WT)
                                                   SEQ 56
AIKLVQSPNGNFAASFVLDGTKWIFKSKYYDSSKGYWVGIYEVWDRK (LCI KR1)
                                                   SEQ 57
AIKLVQSLNGNFAARFVLDGTKWIFKCKYYDSSKGYWVGIYEVWGRK
```

-continued

```
(LCI KR2)
                                                   SEQ 58
AIRLVQSQKCNFAASFVLGGTKWTFKGKYYDSSKDYWVGIYEVRVRK (LCI KR3)
                                                   SEQ 59
AIKQVQSPNGNFAASFVLDGTKWIFKSKYYDSSRGYWVGIYVVWDRK (LCI KR4)
                                                   SEQ 60
AIKLVHSPNGNFAASFVLDGTKWIFKSKFYDSSKGYWVGTYEVWARK
```

The invention claimed is:

1. A plant protection and/or plant growth promotion system, comprising at least one anchor peptide for increased binding to a plant organ or a plant part, the anchor peptide being from 10 to 100 amino acids long and comprising an amino acid sequence selected from SEQ ID NOs: 1-48 or an amino acid sequence at least 80% identical thereto, a support function, which is indirectly or directly bound to the anchor peptide, and an active substance for protecting the plant and/or promoting plant growth and/or yield, wherein the active substance is physically or chemically bound to the support function and wherein the support function serves to connect the active substance with the anchor peptide.

2. The plant protection and/or plant growth promotion system according to claim 1, wherein the active substance is selected from the group consisting of:

a pesticide;

an herbicide;

a bactericide;

a fungicide;

a safener;

a beneficial organism that has a positive effect on the resistance, the disease resistance, the growth and/or the yield of plants; and a plant growth agent.

3. The plant protection and/or plant growth promotion system according to claim 1, wherein the support function is selected from the group consisting of a nanogel, a microgel, a polysome, a polymerosome, a synthosome, a poly-amino acid-spacer, a colloidosome and a cubosome.

4. The plant protection and/or plant growth promotion system according to claim 1, wherein the anchor peptide binds to a leaf, trunk, stem, root, fruit, seed, bud, blossom and/or tuber of a plant.

5. The plant protection and/or plant growth promotion system according to claim 1, wherein the support function is a nano- or microgel and configured such that the active substance either remains on the support function or is released, wherein the release is direct, time delayed, and/or stimulation dependent.

6. The plant protection and/or plant growth promotion system according to claim 5, wherein the support function is stimulation dependently released and the stimulus is selected from the group consisting of pH, temperature, humidity, light (including UV light), duration of irradiation, electric pulses, magnetic pulses, elicitors, enzymatic reactions, microbe associated molecular patterns, pathogen associated molecular patterns, damage associated molecular patterns, and herbivore associated molecular patterns.

7. The plant protection and/or plant growth promotion system according to claim 1, wherein the system is a fusion protein.

8. The plant protection and/or plant growth promotion system according to claim 7, wherein the support function is a spacer of 2-100 amino acids.

9. A method for protecting plants and/or promoting plant growth, comprising the following steps:
   a) providing a plant protection and/or plant growth promotion system according to claim 1, and
   b) applying the plant protection and/or plant growth promotion system onto a plant.

10. The plant protection and/or plant growth promotion system according to claim 1, wherein the support function is selected from the group consisting of a nanogel, a microgel, a polysome, a polymerosome, a synthosome, a poly-amino acid-spacer, a colloidosome and a cubosome.

11. The plant protection and/or plant growth promotion system according to claim 2, wherein the support function is selected from the group consisting of a nanogel, a microgel, a polysome, a polymerosome, a synthosome, a poly-amino acid-spacer, a colloidosome and a cubosome.

12. The plant protection and/or plant growth promotion system according to claim 1, wherein the anchor peptide binds to a leaf, trunk, stem, root, fruit, seed, bud, blossom and/or tuber of a plant.

13. The plant protection and/or plant growth promotion system according to claim 2, wherein the anchor peptide binds to a leaf, trunk, stem, root, fruit, seed, bud, blossom and/or tuber of a plant.

14. The plant protection and/or plant growth promotion system according to claim 3, wherein the anchor peptide binds to a leaf, trunk, stem, root, fruit, seed, bud, blossom and/or tuber of a plant.

15. The plant protection and/or plant growth promotion system according to claim 1, wherein the system is a fusion protein.

16. The plant protection and/or plant growth promotion system according to claim 2, wherein the system is a fusion protein.

17. The plant protection and/or plant growth promotion system according to claim 3, wherein the system is a fusion protein.

18. The plant protection and/or plant growth promotion system according to claim 4, wherein the system is a fusion protein.

19. The plant protection and/or plant growth promotion system according to claim 18, wherein the support function is a spacer of 2-100 amino acids.

20. The plant protection and/or plant growth promotion system according to claim 1, wherein the anchor peptide comprises an amino acid sequence at least 90% identical to an amino acid sequence selected from SEQ ID NOs: 1-48.

* * * * *